US006584386B2

United States Patent
Feser et al.

(10) Patent No.: US 6,584,386 B2
(45) Date of Patent: Jun. 24, 2003

(54) METHOD FOR CONTROLLING AN OCCUPANT PROTECTION DEVICE IN A VEHICLE, AND A CONTROL DEVICE THEREFOR

(75) Inventors: Michael Feser, Barbing (DE); Manfred Frimberger, Ergoldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 117 days.

(21) Appl. No.: 09/799,844

(22) Filed: Mar. 5, 2001

(65) Prior Publication Data

US 2002/0013648 A1 Jan. 31, 2002

Related U.S. Application Data

(63) Continuation of application No. PCT/DE99/02803, filed on Sep. 3, 1999.
(60) Provisional application No. 60/099,178, filed on Sep. 4, 1998.

(51) Int. Cl.[7] .................................................. G06F 7/00
(52) U.S. Cl. ............................................. 701/45; 180/268
(58) Field of Search .............................. 701/45, 46, 47; 180/268, 271

(56) References Cited

U.S. PATENT DOCUMENTS 5,068,793 A   11/1991   Condne et al. ................ 701/46

FOREIGN PATENT DOCUMENTS

| DE | 4207153 A1  | 7/1993 |
| DE | 19707307 A1 | 8/1997 |
| EP | 0727336 A1  | 8/1996 |

OTHER PUBLICATIONS

Published International Application No. 94/14638 (Bischoff et al.), dated Jul. 7, 1994.

Published International Application No. 00/13944 (Feser et al.), dated Mar. 16, 2000.

*Primary Examiner*—William A Cuchlinski, Jr.
*Assistant Examiner*—Edward Pipala
(74) *Attorney, Agent, or Firm*—Laurence A. Greenberg; Werner H. Stemer; Ralph E. Locher

(57) ABSTRACT

In a method for controlling an occupant protection device in a vehicle and a control device therefor, a crash sensor supplies a crash signal. A crash variable derived from the crash signal is compared with a threshold, the occupant protection device is controlled as a function of the overshooting of the threshold by the crash variable. The threshold includes at least one term which, depending on the configuration of the crash signal, supplies a contribution which raises the threshold or a contribution which lowers the threshold.

9 Claims, 7 Drawing Sheets

METHOD FOR CONTROLLING AN OCCUPANT PROTECTION DEVICE IN A VEHICLE, AND A CONTROL DEVICE THEREFOR

CROSS-REFERENCE TO RELATED APPLICATION

This application is a continuation of copending International Application No. PCT/DE99/02803, filed Sep. 3, 1999, which designated the United States, and which in turn is a continuation of U.S. Provisional Application No. 60/099,178, filed Sep. 4, 1998.

BACKGROUND OF THE INVENTION

Field of the Invention

The invention relates to a method for controlling an occupant protection device in a vehicle.

In a known method for controlling an occupant protection device in a vehicle, a crash sensor supplies a crash signal. A crash variable derived from the crash signal is thereupon compared with a threshold. The occupant protection device is controlled as a function of an overshooting of the threshold by the crash variable. As a rule, in this case the threshold contains at least one term that is determined from the crash signal.

In this case, the threshold usually contains a plurality of terms that are additively combined with one another, each term per se, that is to say without taking account of the prescribed sign, being considered with positive values in the threshold. In International Patent Disclosure WO 94/14638, the threshold is composed, for example, of a constant term with the inclusion of a term for the average acceleration and excluding a so-called dynamic term which takes account of a maxima and a minima in the acceleration signal. According to the prior art, therefore, each threshold value term initially supplies a positive contribution. The constants, and also the term of the average acceleration, feature with a positive sign in the threshold value, and so their contributions can contribute only to increasing the threshold in a marked or less marked form. The so-called dynamic term, by contrast, features in the threshold value calculation with a prescribed negative sign, such that the term, which of itself supplies positive values, supplies values which lower the threshold because of the prescribed sign. The prescribed combination of the individual terms can therefore certainly lead to a rise or fall in the threshold. However, viewed per se, each term can supply exclusively positive contributions.

SUMMARY OF THE INVENTION

It is accordingly an object of the invention to provide a method for controlling an occupant protection device in a vehicle, and a control device therefor which overcome the above-mentioned disadvantages of the prior art methods and devices of this general type, in which a threshold reacts extremely flexibly to the crash signal characterizing the course of the accident.

With the foregoing and other objects in view there is provided, in accordance with the invention, a method for controlling an occupant protection device in a vehicle. The method includes using a crash sensor for supplying a crash signal, deriving a crash variable from the crash signal, and comparing the crash variable with a threshold. The threshold includes at least one term determined by the crash signal or a derived signal derived from the crash signal. The term is configured such that, depending on a configuration of the crash signal, it supplies one of a first contribution which raises the threshold and a second contribution which lowers the threshold. The term is determined by positive and negative components summed separately from one another of the crash signal or the derived signal. The occupant protection device is controlled in dependence on an overshooting of the threshold by the crash variable.

In the invention, the sensor detecting the accident or crash supplies the crash signal. The sensor can be configured as an acceleration sensor that supplies an acceleration signal. In this case, the axis of sensitivity of the acceleration sensor is preferably aligned in that direction from which it is intended to detect a crash. Acceleration sensors for detecting crashes from the side are therefore preferably sensitive transverse to the vehicle longitudinal axis and are fastened in the center of the vehicle, but also on the side of the vehicle on side doors or door sills. An acceleration sensor for detecting a front crash is preferably likewise disposed in the center of the vehicle, but possibly also on the front of the vehicle, and picks up acceleration signals along the vehicle longitudinal axis. However, it is also possible to provide as crash sensors sensors for the direct or indirect penetration of an obstacle into the vehicle. For example, in a direct type a capacitively configured deformation sensor picks up the penetration of an obstacle, in the case of this sensor the outer skin of the vehicle being provided as an electrode, and a further electrode being provided which cooperates with the vehicle outer skin and is installed in a stationary fashion. In an indirect way, a crash sensor can preferably detect a crash from the side by picking up an air pressure in a cavity in the vehicle door. The deformation of the vehicle door initiated by the penetration of the obstacle varies the volume of the cavity, and this leads to a rise in air pressure that can be detected in the crash signal, which is configured as a pressure signal. A crash variable that is compared with a threshold is usually derived from such a crash signal. The crash variable can in this case be the crash signal itself, or preferably be derived from the crash signal by mathematical calculations. In this case, it is preferable to use a partial speed loss, also termed delta V, as the crash variable. For this purpose, the acceleration signal, which is subsequently used as the crash signal, is integrated from the start of the crash. The integrated acceleration signal therefore supplies the decrease in speed from the start of the crash. A partial speed loss is then formed by the difference between the actual speed value and a speed value that was and is stored in a memory determined at an earlier instant. The partial speed loss is preferably compared with the threshold.

The threshold is of variably configured, in this case, and can assume different threshold values over time. The threshold is usually composed additively in this case from a plurality of terms. Each term is a mathematical expression of self-contained content. One term of the threshold can be a constant in this case. Another term can have, for example, a time-linear member in this case. The threshold preferably therefore contains a plurality of terms that are related to one another additively.

The threshold in this case contains at least one term that is determined by the crash signal. Determination by the crash signal can be provided in various ways. Thus, for example, a term can contain the crash signal or a signal derived from the crash signal and directly proportional thereto. As a result, the threshold value characteristic is proportional to the crash signal at least in this term. In a further version, such a term can be determined by the crash signal with the aid of logic combinations. Thus, the term can provide a first constant value when the crash signal undershoots an assigned value. A second, higher constant value can be provided as soon as the crash signal overshoots the assigned value.

The occupant protection device is controlled as a function of the overshooting of the threshold by the crash variable. The occupant protection device can be triggered directly in this case when the threshold is overshot by the crash variable. The overshooting of the threshold by the crash variable can alternatively, however, be one of a plurality of triggering criteria which are logically combined with one another and, in particular, combined with one another in a Boolean fashion. The overshooting of the threshold cooperating only, for example, with the fulfillment of a further criterion for the purpose of activating the assigned occupant protection device. Airbags, in particular driver, passenger, side, head, chest or other airbags, can be provided as the occupant protection device, as can also seat belt pretensioners or rollover protection devices.

According to the invention, at least one term of the threshold is configured in such a way that, depending on the configuration of the crash signal, it supplies a contribution that raises the threshold or a contribution that lowers the threshold. Accordingly, the term itself can supply both positive and negative values as a function of the crash signal. If, therefore, such a term is introduced into the threshold with a positive sign fixed a priori, the term can raise the threshold or lower it, an overall raising of the threshold or an overall lowering of it also depending, of course, on the contributions of further terms. If such a term with a negative sign fixed a priori is introduced into the threshold, in the event of the supply of negative contributions the term can raise the threshold, and in the event of the supply of positive contributions it can lower the threshold. It is fundamental to the invention that, therefore, a singular term is configured in such a way that it can react in an extremely flexible and rapid way to the crash signal as a function thereof and, consequently, can not only raise the threshold to a lesser or greater extent, but can also simultaneously lower the threshold when it appears from the crash signal that lowering of the threshold is indicated.

The term can be determined from the start of the crash by a speed loss of the vehicle derived from the crash signal. In this case, the speed loss is usually determined by integrating the acceleration from the start of the crash, which is to say from the overshooting of an initial limiting value by the acceleration picked up. The speed loss thereby reproduces the overall energy loss during the crash. The speed loss is determined during the period of the overall crash and at any time supplies the information on the crash energy reduced from the start of the crash up to the respective instant. Consideration of the energy of the crash is therefore imported into the threshold value characteristic with the aid of this term, such that the occupant protection device is triggered as a function of the reduced kinetic energy, and thus as a function of the severity of the crash.

A further term of the threshold is directed toward detecting oscillations in the crash signal. Strong oscillations in the crash signal usually permit the inference of a crash in which the occupant protection device is not to be triggered. Such so-called misuse impacts are, for example, introduced by a hammer blow against the vehicle body. Such a hammer blow can lead to large deceleration amplitudes on the vehicle. However, the vehicle can reduce the transmitted energy by vibrating strongly. Whereas in the event of a severe crash in which the occupant protection device is to be triggered, a larger impulse usually acts on the vehicle such that it is not possible for the vehicle to reduce the transmitted energy through dissipation by vibration. Thus, taking account of the oscillations in the crash signal preferably serves to distinguish misuse crashes from severe accidents.

Another term likewise serves to distinguish a misuse crash from a "normal" crash. Once again, a strong tendency to oscillation in the crash signal is characteristic of a misuse crash, the crash signal oscillating about the zero point, in particular. Energy transmitted by a short impact (misuse) can be reduced by oscillation of the vehicle. By contrast, in the event of a normal crash the crash signal predominantly exhibits values in a direction of deceleration. By considering the instants at which the crash signal overshoots an upper threshold value and, on the other hand, undershoots a lower threshold value, it is possible to influence the threshold in an advantageous way. If the crash signal undershoots the lower threshold value, and if the threshold value is in a range of values in which a crash signal resulting from a normal crash is expected—in the event of an impact a deceleration, that is to say a negative acceleration, is expected as a rule—the absolute value of the threshold is lowered successively by increments during the time interval in which the crash signal exceeds the upper limiting value, and triggering is facilitated. If, however, the crash signal overshoots an upper limiting value which preferably has a sign opposite to the lower limiting value, and thereby characterizes acceleration values opposing the direction of the crash, successive incremental values are added in absolute terms to the threshold during this time interval, and triggering is thereby rendered more difficult.

Still another term is described which likewise features in the threshold value calculation in addition to the other, previously described terms, preferably in an additive fashion. Acceleration pulses in the crash signal that are significant in the event of a crash owing to the penetration of an obstacle are detected with the aid of a term of such configuration as an indicator for mechanical deformation of the vehicle body structure, and the threshold is influenced in accordance therewith.

In accordance with an added mode of the invention, there is the step of determining the term from a speed loss of the vehicle from a start of a crash determined from the crash signal.

In accordance with an additional mode of the invention, there is the step of determining a ratio of a negative component to a positive component, and the term is determined by a difference between the ratio and a limiting value.

In accordance with another mode of the invention, there is the step of providing the difference with different weighting factors in the term, depending on whether the ratio overshoots or undershoots the limiting value.

In accordance with a further mode of the invention, there is the step of determining the term by an overshooting of an upper limiting value by the crash signal or the derived signal and also by an undershooting of a lower limiting value by the crash signal or the derived signal. The term supplies a contribution that raises an absolute value of the threshold when the upper limiting value is overshot, and the term supplies a contribution which lowers the absolute value of the threshold when the lower limiting value.

In accordance with another added mode of the invention, there is the step of determining the threshold by a difference in levels of two time-sequential extreme values in one of the crash signal and the derived signal.

In accordance with another additional mode of the invention, there is the step of lowering the threshold in absolute value in dependence on a difference in the levels of the two time-sequential extreme values.

In accordance with a concomitant mode of the invention, there is the step using an acceleration sensor for supplying the crash signal and the crash signal is determined by a current vehicle acceleration.

With the foregoing and other objects in view there is further provided, in accordance with the invention, a control device for an occupant protection device. The control device includes a microprocessor programmed to perform the steps described above.

Other features which are considered as characteristic for the invention are set forth in the appended claims.

Although the invention is illustrated and described herein as embodied in a method for controlling an occupant protection device in a vehicle, and a control device therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 3:
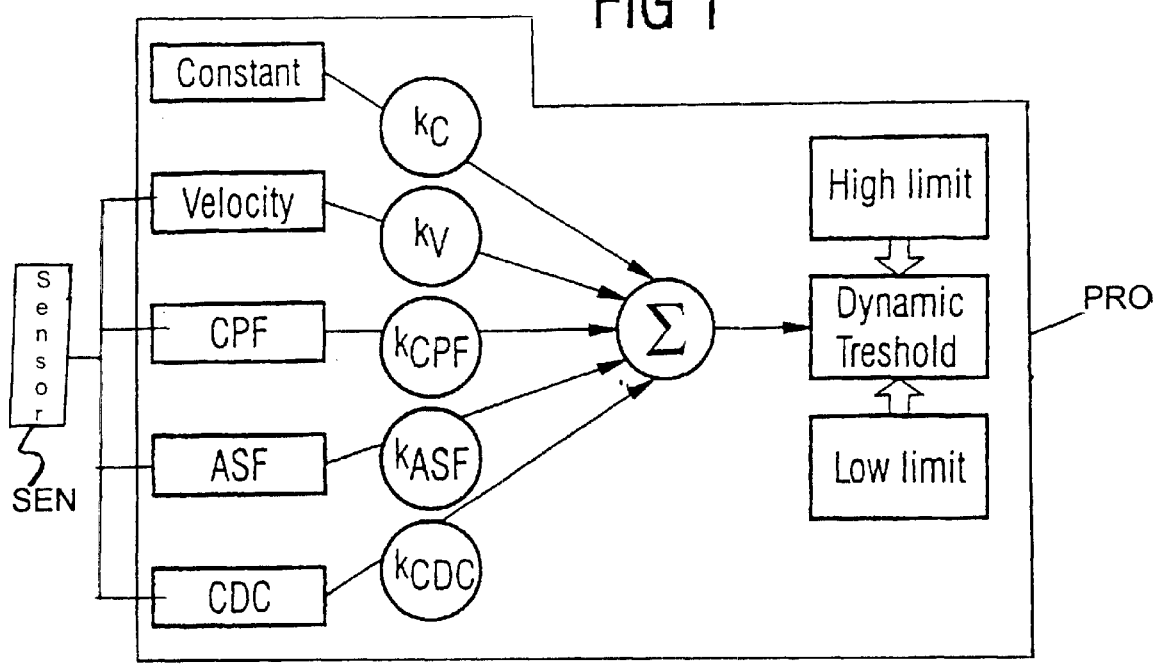
FIG. 1 is a block diagram for forming a threshold according to the invention.
FIG. 3 is a chart showing a direction of action of the individual terms forming the threshold.

In all the figures of the drawing, sub-features and integral parts that correspond to one another bear the same reference symbol in each case. Referring now to the figures of the drawing in detail and first, particularly, to FIG. 1 thereof, there is shown a block diagram for calculating a triggering threshold of a triggering algorithm for controlling an occupant restraining device. In this case, the triggering threshold is composed in an additive fashion from the terms crash direction correlation (CDC), acceleration symmetry & frequency (ASF), crash pulse function (CPF), velocity and a constant, each term being multiplied by a weighting factor $K_{CDC}$ and $K_{ASF}$ and $K_{CPF}$ and $K_V$ and $K_C$, respectively. In accordance with FIG. 1, the triggering threshold formed in such a way can assume values in an extremely wide range of values. An advantageous limitation of the threshold at an upper and at a lower end is lent support in accordance with FIG. 1 for reasons relating to triggering content and also computation. The individual terms are explained in more detail below. With the exception of the term "constant", all the other terms are determined by a crash signal supplied by a crash sensor SEN, in the present case an acceleration sensor SEN.

The acceleration signal functioning as the crash signal is usually supplied in analog form and is fed to an analog-to-digital converter. The signal digitized in this way is fed to a microcontroller or microprocessor PRO that is intended to make a triggering decision. In this case, the digitized acceleration signal is preferably subjected to the following operations in the controller PRO which prepares a triggering decision: the digitally converted acceleration signal is filtered digitally, integrated if appropriate and differentiated if appropriate. If appropriate, sums or differences are formed between differently determined average values. In addition, the acceleration signal is used to derive at least one, but preferably a plurality of terms of the threshold. Furthermore, a crash variable that is subsequently compared with the threshold is derived from the acceleration signal. The so-called partial speed loss is suitable as the crash variable. This variable reproduces the partial energy reduction in the event of a crash. In other words, the variable, which is preferably denoted as delta V, reproduces the information on the severity of the crash in a defined short-term time window. The partial speed loss can be determined in various ways: the acceleration is first integrated, and the speed reduction at any instant is thereby determined from an initial instant. The partial speed loss is then yielded from $$\Delta v(t)=v(t)-v(t-k),$$

where k is a length of the time window over which the partial speed loss is calculated.

Alternatively, the partial speed loss delta V is calculated using the following formula:

$$\Delta v(t) = \sum_{K=0}^{K\text{Max}} a(t-k)$$

The crash variable delta V formed in such a way is subsequently compared with a dynamically configured threshold. A possible strategy for triggering the occupant protection device can consist in that the protection device is activated as soon as the crash variable overshoots the threshold. However, the protection device is preferably triggered when the threshold is overshot by the crash variable and, at the same time, a minimum speed loss is detected. In addition to the latter triggering strategy, the occupant protection device can also be triggered whenever a speed loss that is extremely large is detected.

The speed loss is calculated using the following formula:

$$v(t) = \int a(t) \cdot dt = \sum_i a_i$$

The above named triggering strategy derives its advantages from the fact that in the event of an extremely large speed loss time is gained by adopting the alternative triggering path. Triggering the protection device through the overshooting of the threshold value by the crash variable is permitted only when a minimum speed loss is detected. This minimum speed loss can be interpreted as a type of safing function.

Figure 2:
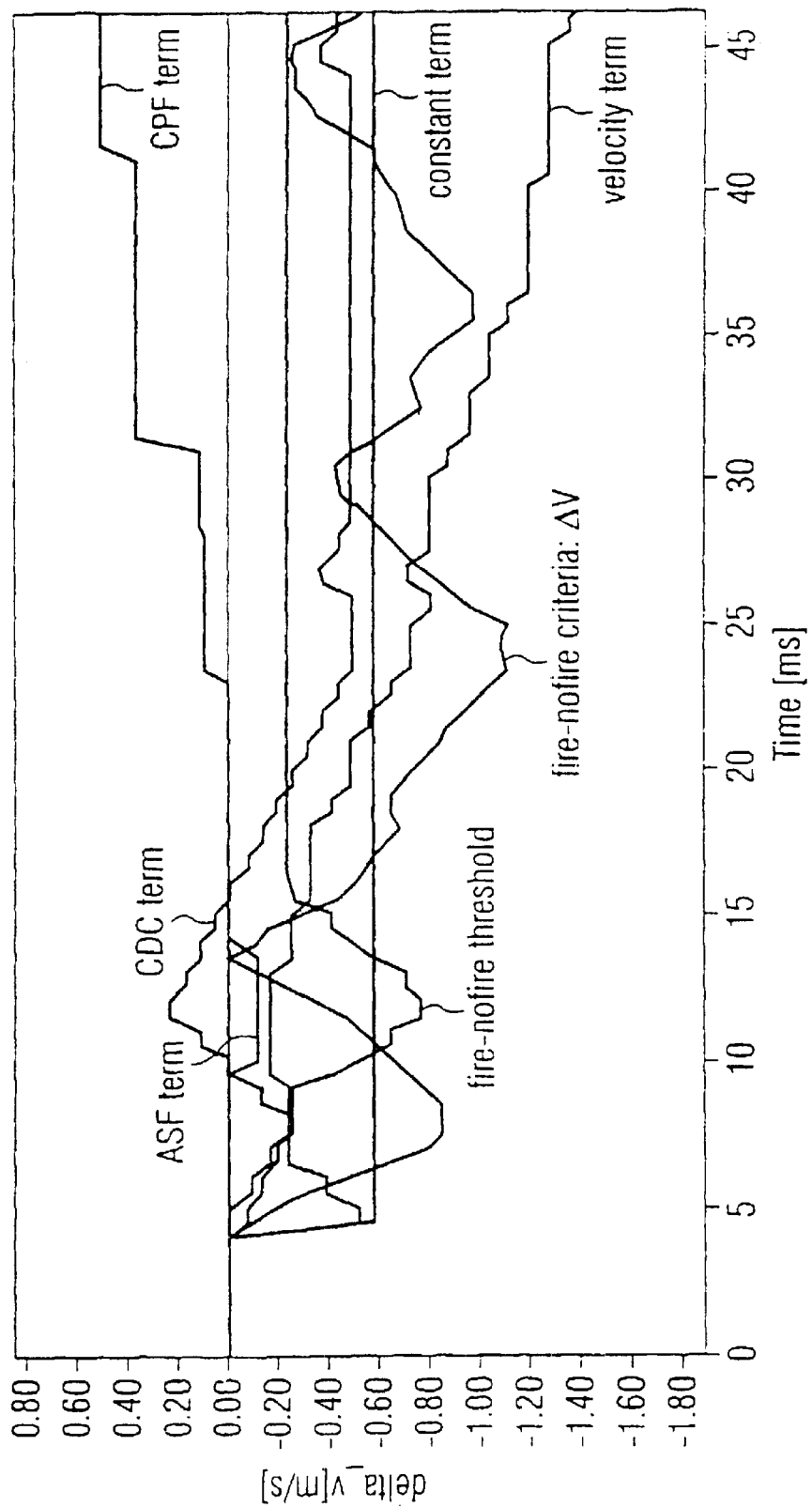
FIG. 2 is a graph showing a time characteristic of individual terms forming the threshold.

FIG. 2 shows the terms, listed in FIG. 1, of the dynamic threshold against time and plotted individually relative to an acceleration signal (not illustrated). Also to be seen in the diagram are the "fire-no fire threshold", composed from the individual terms, and the "fire-no fire criteria: Δv" crash variable which is compared with the threshold. It follows from FIG. 2, in particular, that except for the constant term and the CPF term, which is strictly monotonically rising, every other term has falling and rising sections as a function of the crash signal picked up. According to the invention, however, these terms can, as follows in accordance with FIG. 2, in particular in the case of the CDC term, supply both positive and negative contributions to the threshold as a function of the configuration of the crash signal. In this case, the CDC term supplies a negative contribution to the threshold between the fifth and the tenth millisecond, a positive contribution between the tenth and, for example, sixteenth milliseconds, and negative contributions once again from the sixteenth millisecond.

FIG. 3 in turn lists the individual terms as components, and indicates the possible influence exerted by the respective term on the threshold with the aid of direction of action indicated in the form of arrows. Thus, the constant term can lead only to a lowering of the threshold, whereas the CPF term can lead only to a raising of the threshold. According to the invention, the remaining terms can supply contributions both to raising and to lowering the threshold.

The velocity term of the threshold is calculated by analog or digital integration of the acceleration signal from the start of the crash. The start of the crash being marked by overshooting of a starting threshold at the level of g or 2 g. The velocity term can be subtracted from the threshold or added to it, and so the threshold is set to be more or less sensitive to triggering.

In the case of the ASF term, the positive and negative components of the acceleration signal are considered. Integration is carried out over these components separately from one another, thus determining a sum value over the positive acceleration components and a sum value over the negative acceleration components.

Figure 4:
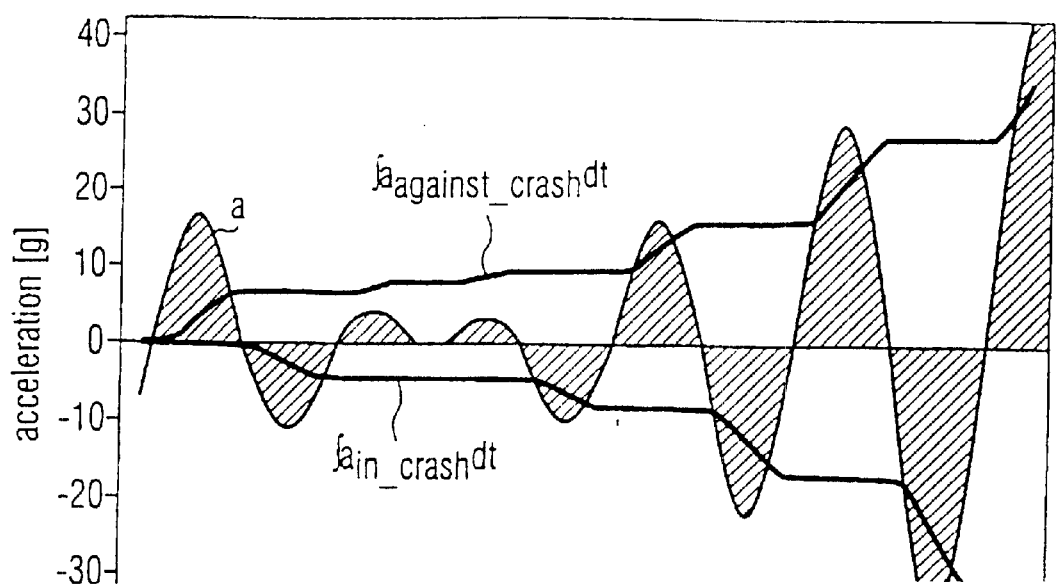
FIG. 4 is a graph showing an acceleration characteristic for forming an ASF term.

With the aid of an exemplary acceleration signal a, FIG. 4 shows hatched components, the components below the zero line being acceleration components in the direction of the crash, that is to say $a_{in\text{-}crash}$, while the acceleration components above the zero line, by contrast, are those in the direction against the crash $a_{against\text{-}crash}$. The summing of the respective negative or positive acceleration components is supplied by the two curve integrals illustrated in the diagram. The ratio of the summed positive and negative components is subsequently formed.

Figure 5A:
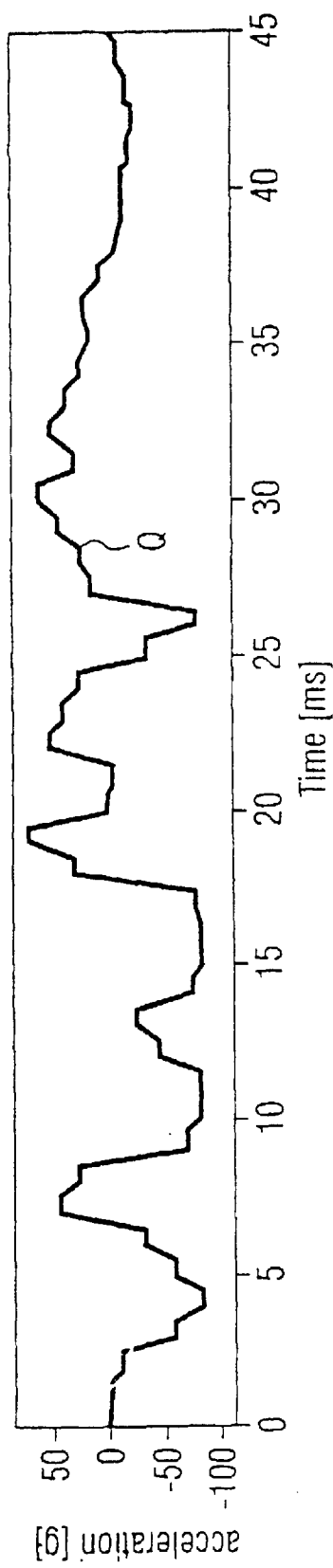
FIGS. 5A and 5B are graphs showing time characteristics for explaining the ASF term.
Figure 5B:
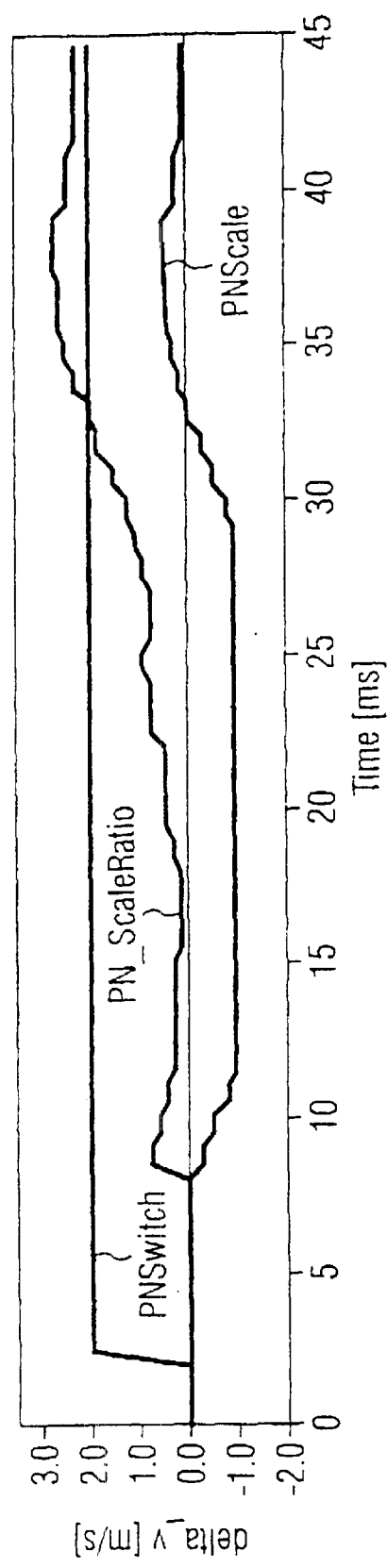

FIG. 5A shows in this regard, by way of example, an acceleration characteristic over time, and in relation to the ratio of positive summed acceleration components to negative summed acceleration components, namely, a P_ScaleRatio, illustrated in FIG. 5B. FIG. 5B shows that initially the ratio predominates slightly in favor of the positive components in the acceleration signal on the basis of the positive acceleration excursion at approximately seven and a half milliseconds. These components are, however, virtually balanced by the negative acceleration components prevailing between the approximately eighth and eighteenth milliseconds, and so the ratio PN_ScaleRatio in this period moves forward of the zero line. However, from the eighteenth millisecond a clear predominance of positive acceleration components is to be established in the crash signal, and so the ratio PN_ScaleRatio rises continuously.

The ASF term, which finally figures in the threshold, is formed by subtracting the ratio PN_ScaleRatio from the prescribed limiting value PNSwitch. The threshold behaves in a fashion proportional to the difference PNScale, and this is also to be seen, in particular, in FIG. 5b. It can be provided in this case that the contribution of the ASF term, as is also shown in FIG. 5b, can be bounded above and/or below. According to the following example, the ASF term therefore supplies a contribution, which increases the threshold into the negative range of values as soon as predominantly positive acceleration components are established in the signal. Since the present description of the figures is substantially provided with exemplary embodiments which are to provide triggering of an occupant protection device when a specific vehicle deceleration is present as a negative vehicle acceleration, triggering is desired only when the threshold in the negative range of values is overshot by the crash variable of a negative form. Seen mathematically, overshooting in this sense is undershooting of the negative threshold by the negative crash variable. Thus, if the negative threshold is drawn further into the negative range, triggering is rendered difficult, as is the case between the seventh and thirty-second milliseconds in accordance with FIG. 5B. The predominantly positive acceleration components in the acceleration signal in this time interval indicate a misuse crash, since in the case of a normal crash predominantly negative acceleration components are expected, and so triggering by raising the threshold in terms of absolute value is rendered difficult. If, by contrast, predominantly negative acceleration components are established in the crash signal, triggering is facilitated in the sense that the absolute value of the threshold is reduced, in the present case the values of the negative threshold being increased, thus facilitating triggering.

Figure 6:
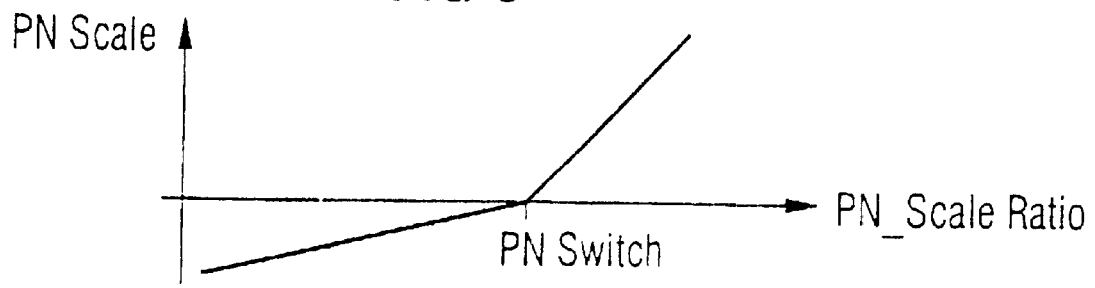
FIG. 6 is a graph of a characteristic curve for forming the ASF term.

FIG. 6 shows a characteristic curve for a particularly advantageous version of the ASF term. In this case, the previously described ASF term PNScale, formed as a difference, is provided with a weighting factor which is configured in such a way that in the case of a positive ASF term, that is to say given predominantly positive acceleration components and the suspicion of a misuse crash, the ASF term increases the threshold to a greater extent than would be the case upon reduction of the absolute value of the threshold in the case of a crash signal with predominantly negative acceleration components. Such a configuration of the ASF term is based on the fact that triggering should not in any way occur in the case of a misuse crash.

Figure 7:
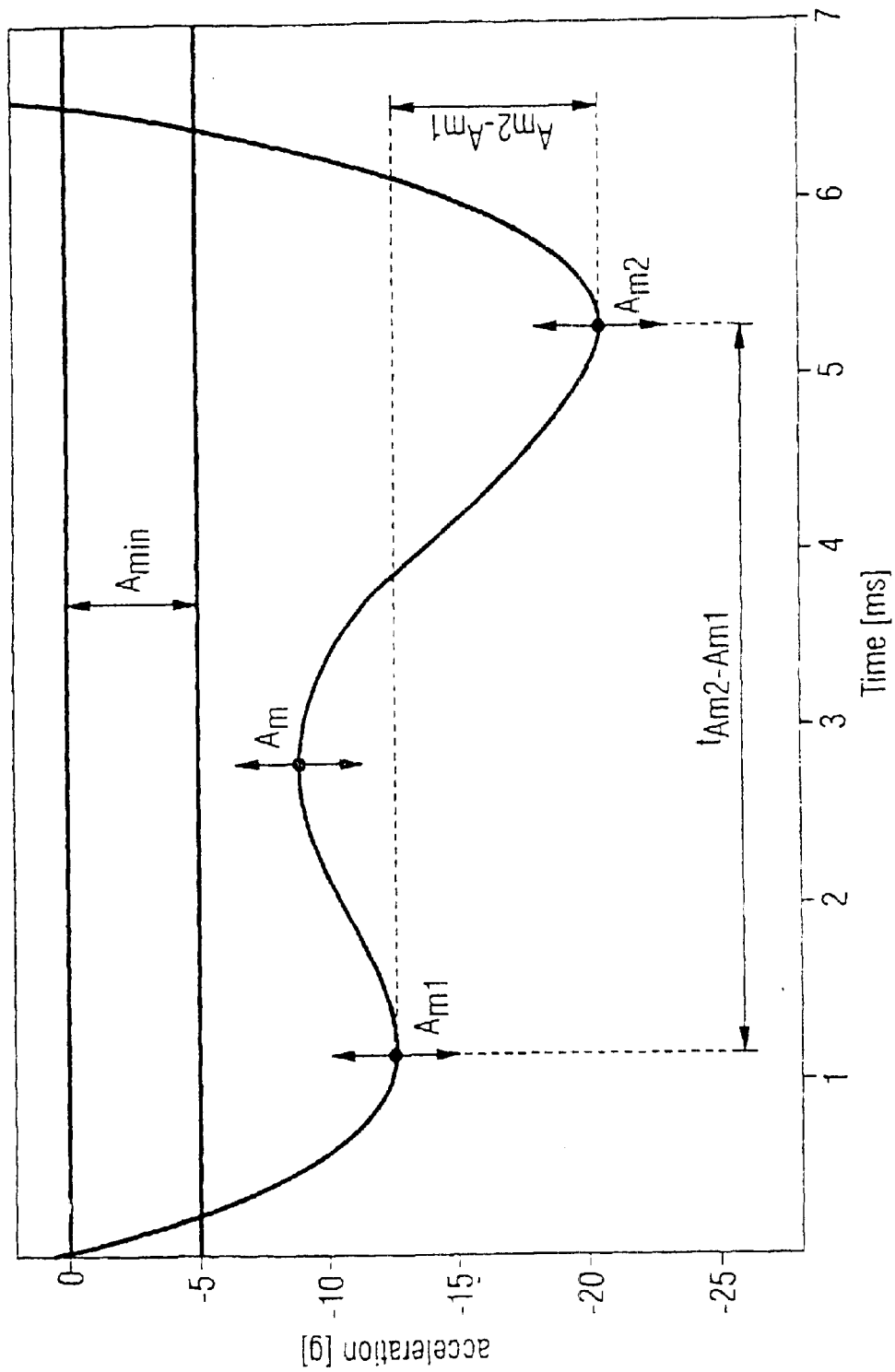
FIG. 7 is a graph of an acceleration characteristic for explaining a CPF term.
Figure 8A:
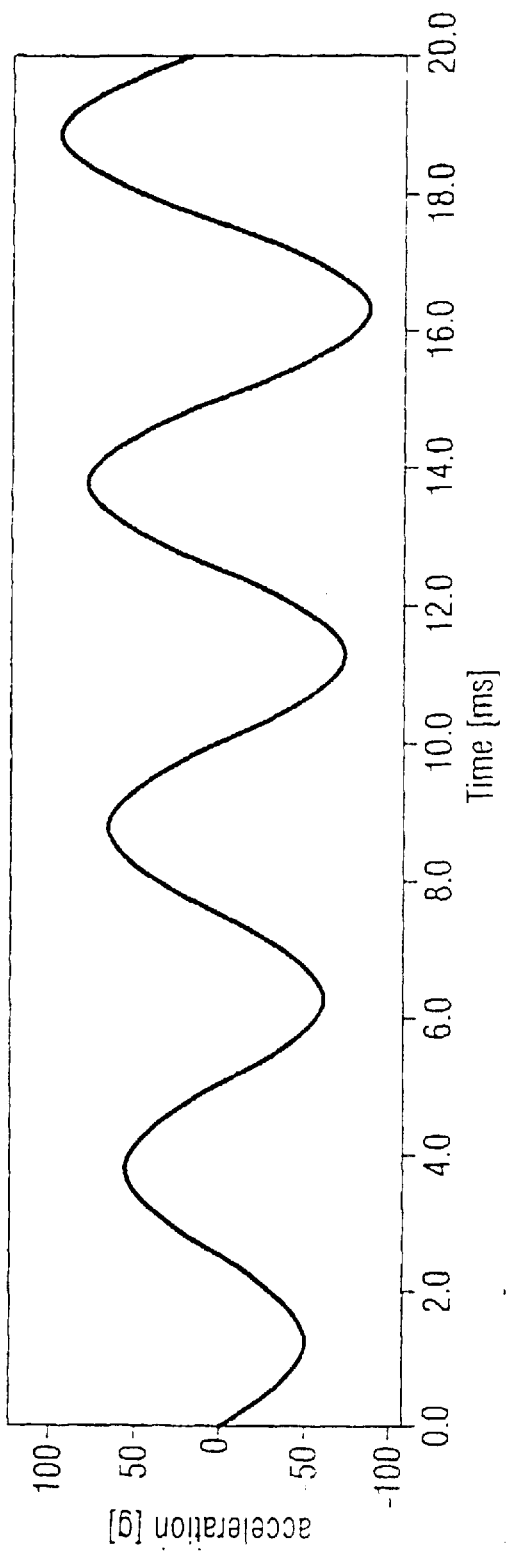
FIGS. 8A and 8B are graphs of time characteristics of the CPF term.
Figure 8B:
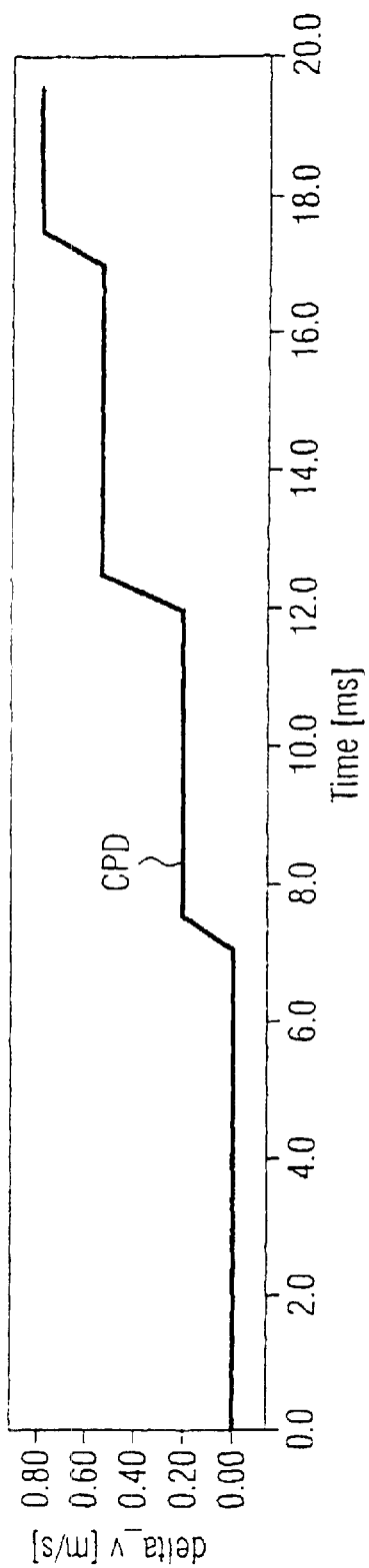

The CPF term is explained with the aid of FIGS. 7, 8A and 8B. This term can result in raising the negative threshold in a way facilitating triggering, or reducing the absolute value of the threshold in a way facilitating triggering. In this case, the extreme values of the crash signal are considered and, in particular, the coordinates of two consecutive minima in the crash signal. FIG. 7 shows two such consecutive minima with the amplitudes $A_{m1}$ and $A_{m2}$. The CPF term exclusively supplies a contribution to the threshold when the level of the minimum $A_{m2}$ occurring later in time is greater than the level of the minimum $A_{m1}$ earlier in time. Only given this condition is it possible to use the signal to proceed from an oscillating signal front which is building up. Misuse crashes, by contrast, are certainly likewise distinguished by strong oscillations, but these oscillations decay over time, starting from an absolute extreme value at the start of the misuse crash. In contrast, in the case of a real crash the levels in the acceleration signal grow with increasing time, and therefore so do the minima, in a corresponding way.

Thus, in particular the level difference between the last minimum in time and the minimum occurring before that features proportionally in the CPF term. Influencing the threshold for this purpose is undertaken only when the last minimum level is greater than the penultimate minimum level and, at the same time, there is no overshooting of a prescribed time interval between the minimum levels, see $t_{am2}-t_{am1}$ in FIG. 7.

FIGS. 8A and 8B shows by way of example an acceleration signal with growing oscillations. FIG. 8B shows in this regard the contributions of the associated CPF term to the threshold. The CPF term can preferably supply a contribution to the threshold only when the minima have undershot a prescribed value $A_{min}$ in accordance with FIG. 7.

Figures 9A, 9B:
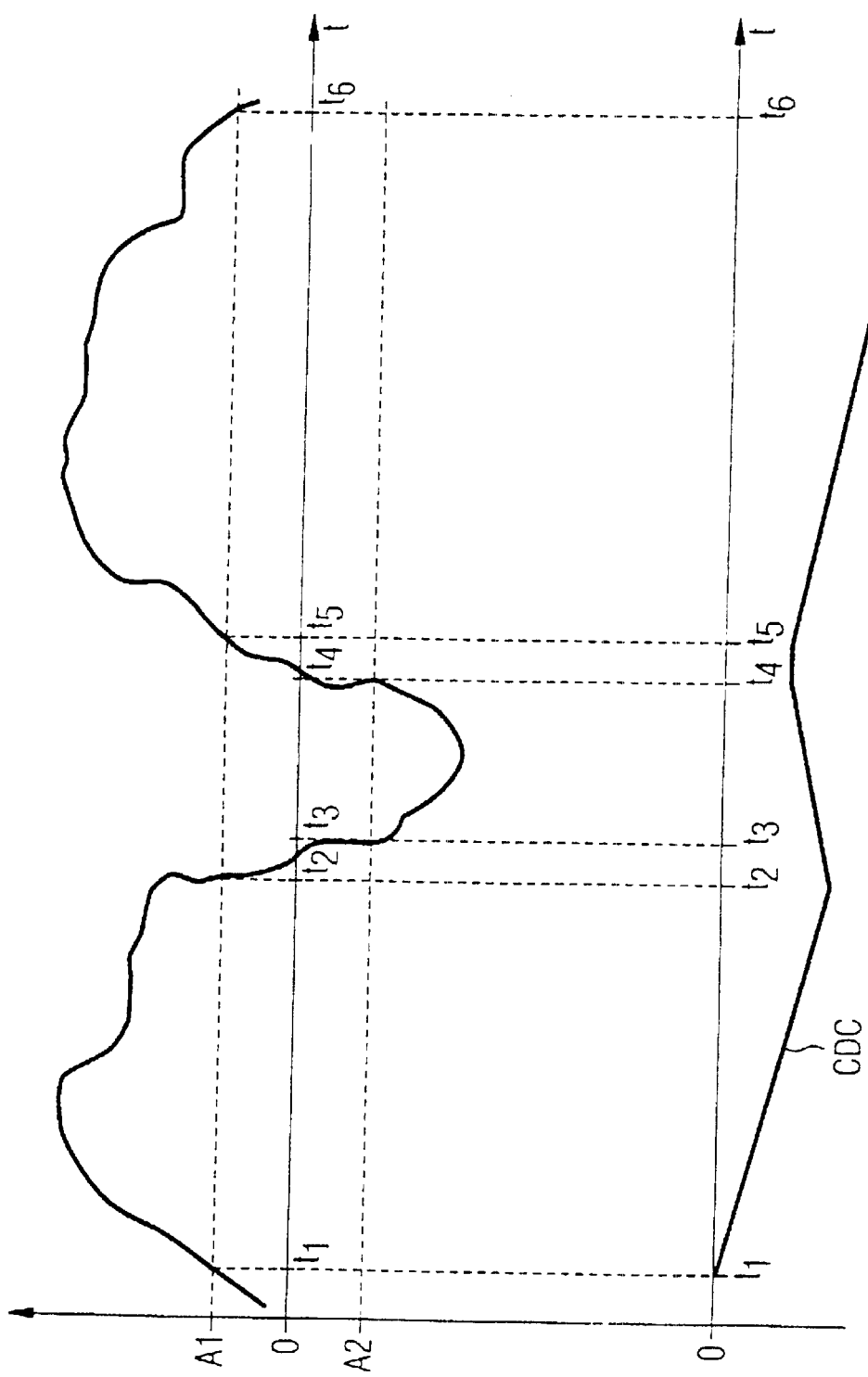
FIGS. 9A and 9B are graphs of time characteristics for explaining a CDC term.

The CDC term is explained with reference to FIGS. 9A and 9B. FIG. 9A shows an acceleration signal by way of example. FIG. 9B shows the associated CDC contribution to the threshold value. In this case, the CDC term supplies a contribution, which further lowers the negative threshold, but thereby raises the absolute value of the threshold and renders triggering more difficult, in the periods $t_1<t<t_2$ and $t_5<t<t_6$, in which the acceleration signal overshoots a prescribed positive threshold $A_1$. Therefore, within these time intervals the acceleration signal picked up has a positive sign, and therefore indicates a misuse crash. Decelerations, and thus negative acceleration values usually occur in the case of a real crash. In the above-mentioned periods, triggering is therefore increased by a rise in the absolute value of the threshold. By contrast, in the period $t_3<t<t_4$ the negative threshold $A_2$ is undershot by the acceleration signal, and this supports the occurrence of a real crash. Consequently, triggering is facilitated in this period by virtue of the fact that the negative threshold is raised, and thus the absolute value of the threshold is reduced. It is to be seen, in particular, that the CDC term can assume positive and negative values, and thus reacts extremely flexibly to the crash signal. The contribution made to the threshold by the CDC term can be bounded by an upper and lower bound.

The present algorithm and, particularly, the threshold value configuration in this case are preferably suitable for triggering side crash protection devices. A remotely sited acceleration sensor is preferably disposed for this purpose on the side of the vehicle. The proposed method is advantageously suitable for triggering a side crash protection device solely on the basis of the crash signals supplied by the acceleration sensor.

The proposed method supplies in an extremely suitable way, contributions satisfying the individual and various types of crashes. Finally, exceptionally precise distinctions can be made between a fire crash and a no fire crash with the aid of the proposed method.

We claim:

1. A method for controlling an occupant protection device in a vehicle, which comprises the steps of:
    using a crash sensor for supplying a crash signal;
    deriving a crash variable from the crash signal;
    comparing the crash variable with a threshold, the threshold includes at least one term determined by one of the crash signal and a derived signal derived from the crash signal, the term is configured such that, depending on a configuration of the crash signal, it supplies one of a first contribution which raises the threshold and a second contribution which lowers the threshold, and the term is determined by positive and negative components summed separately from one another of one of the crash signal and the derived signal; and
    controlling the occupant protection device in dependence on an overshooting of the threshold by the crash variable.

2. The method according to claim 1, which comprises determining the term from a speed loss of the vehicle from a start of a crash determined from the crash signal.

3. The method according to claim 1, which comprises determining a ratio of a negative component to a positive component, and the term is determined by a difference between the ratio and a limiting value.

4. The method according to claim 3, which comprises providing the difference with different weighting factors in the term, depending on whether the ratio overshoots or undershoots the limiting value.

5. The method according to claim 1, which comprises determining the term by an overshooting of an upper limiting value by one of the crash signal and the derived signal and also by an undershooting of a lower limiting value by one of the crash signal and the derived signal, the term supplies a contribution which raises an absolute value of the threshold when the upper limiting value is overshot by one of the crash signal and the derived signal, and the term supplies a contribution which lowers the absolute value of the threshold when the lower limiting value is undershot by one of the crash signal and the derived signal.

6. The method according to claim 1, which comprises determining the threshold by a difference in levels of two time-sequential extreme values in one of the crash signal and the derived signal.

7. The method according to claim 6, which comprises lowering the threshold in absolute value in dependence on a difference in the levels of the two time-sequential extreme values.

8. The method according to claim 1, which comprises using an acceleration sensor for supplying the crash signal and the crash signal is determined by a current vehicle acceleration.

9. A control device for an occupant protection device, comprising:
    a microprocessor programmed to:
        receive a crash signal from a crash sensor;
        derive a crash variable from the crash signal;
        compare the crash variable with a threshold, the threshold includes at least one term determined by one of the crash signal and a derived signal derived from the crash signal, the term is configured such that, depending on a configuration of the crash signal, it supplies one of a first contribution which raises the threshold and a second contribution which lowers the threshold, and the term is determined by positive and negative components summed separately from one another of one of the crash signal and the derived signal; and
        control the occupant protection device in dependence on an overshooting of the threshold by the crash variable.

* * * * *